US012596052B2

(12) United States Patent
Dewailly

(10) Patent No.: US 12,596,052 B2
(45) Date of Patent: Apr. 7, 2026

(54) APPARATUS AND METHOD FOR AUTOMATIC LEAK DETECTION

(71) Applicants:ATEQ CORP, Livonia, MI (US);
ATEQ, Les Clayes-sous-Bois (FR);
ATEQ SINGAPORE PTE. LTD.,
Singapore (SG)

(72) Inventor: Guy D. Dewailly, White Bluff, TN (US)

(73) Assignees: ATEQ Corp, Livonia, MI (US);
ATEQ, Les Clayes-sous-Bois (FR);
ATEQ Singapore Pte. Ltd., Singapore (SG)

( * ) Notice: Subject to any disclaimer, the term of this patent is extended or adjusted under 35 U.S.C. 154(b) by 264 days.

(21) Appl. No.: 18/030,229

(22) PCT Filed: Oct. 4, 2021

(86) PCT No.: PCT/US2021/053372
§ 371 (c)(1),
(2) Date: Apr. 4, 2023

(87) PCT Pub. No.: WO2022/076307
PCT Pub. Date: Apr. 14, 2022

(65) Prior Publication Data
US 2024/0027300 A1 Jan. 25, 2024

Related U.S. Application Data

(60) Provisional application No. 63/087,673, filed on Oct. 5, 2020.

(51) Int. Cl.
*G01M 3/32* (2006.01)

(52) U.S. Cl.
CPC ................................ *G01M 3/3272* (2013.01)

(58) Field of Classification Search
None
See application file for complete search history.

(56) References Cited

U.S. PATENT DOCUMENTS

| | | | |
|---|---|---|---|
| 7,347,087 B2 | 3/2008 | Rankin et al. | |
| 9,377,374 B2 | 6/2016 | Brine et al. | |
| 2013/0325194 A1* | 12/2013 | Brine .................. | G05D 7/0629 |
| | | | 700/282 |
| 2018/0087998 A1 | 3/2018 | Bright et al. | |
| 2025/0207015 A1* | 6/2025 | Liang .................... | C09K 8/685 |

* cited by examiner

*Primary Examiner* — Alexander A Mercado
(74) *Attorney, Agent, or Firm* — Dierker & Kavanaugh, P.C.

(57) ABSTRACT

An apparatus for automatic leak detection includes an adiabatic tank, an electronic pressure regulator in fluid communication with the adiabatic tank, and an electronic processor in electronic communication with the electronic pressure regulator. The electronic processor is to automatically determine an optimum adiabatic pressure based on an ambient atmospheric pressure, a test pressure, and an ambient air temperature. The apparatus is to generate the optimum adiabatic pressure automatically in the adiabatic tank via the electronic pressure regulator in communication with the electronic processor.

15 Claims, 6 Drawing Sheets

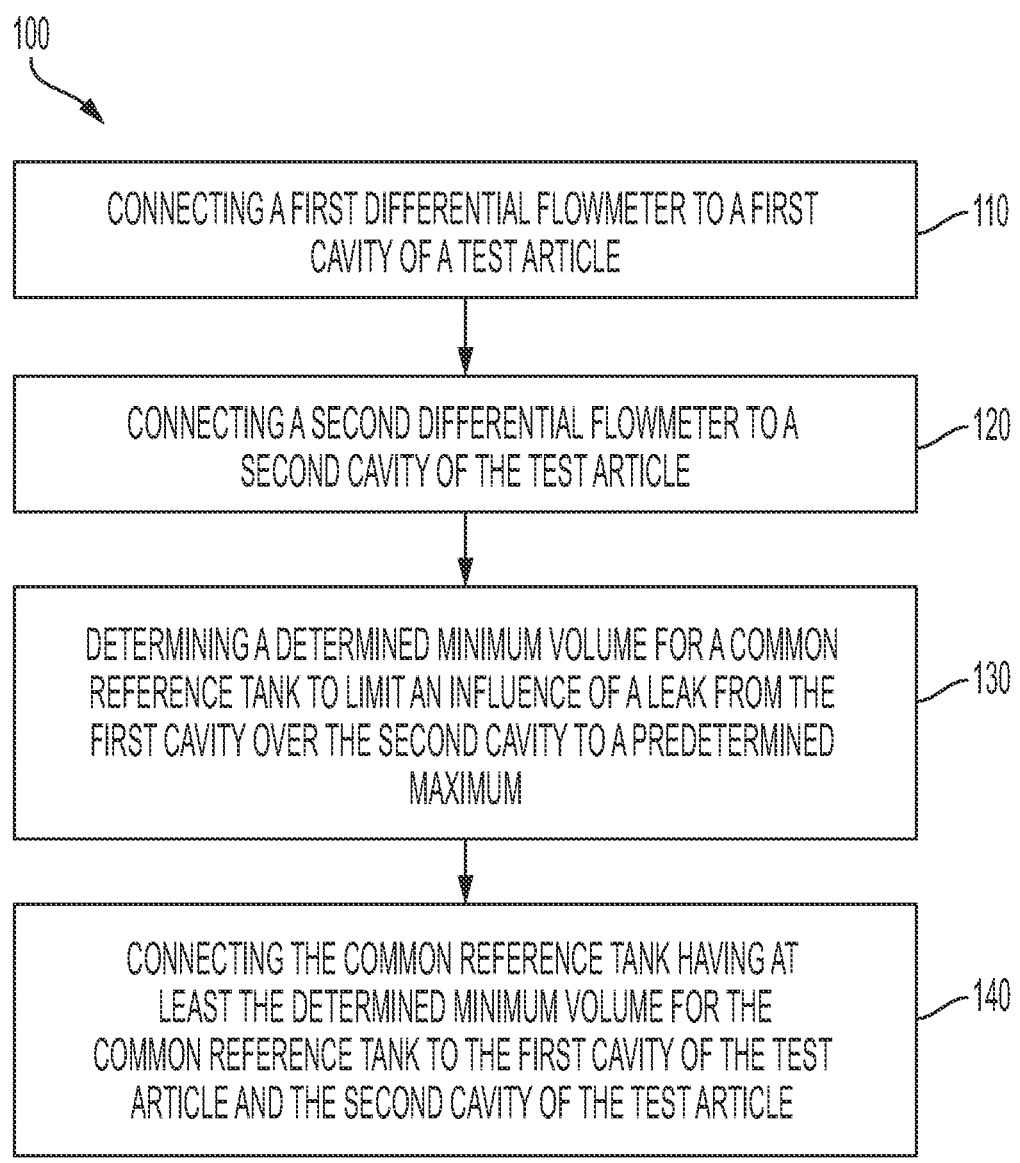

100

CONNECTING A FIRST DIFFERENTIAL FLOWMETER TO A FIRST CAVITY OF A TEST ARTICLE — 110

CONNECTING A SECOND DIFFERENTIAL FLOWMETER TO A SECOND CAVITY OF THE TEST ARTICLE — 120

DETERMINING A DETERMINED MINIMUM VOLUME FOR A COMMON REFERENCE TANK TO LIMIT AN INFLUENCE OF A LEAK FROM THE FIRST CAVITY OVER THE SECOND CAVITY TO A PREDETERMINED MAXIMUM — 130

CONNECTING THE COMMON REFERENCE TANK HAVING AT LEAST THE DETERMINED MINIMUM VOLUME FOR THE COMMON REFERENCE TANK TO THE FIRST CAVITY OF THE TEST ARTICLE AND THE SECOND CAVITY OF THE TEST ARTICLE — 140

FIG. 8

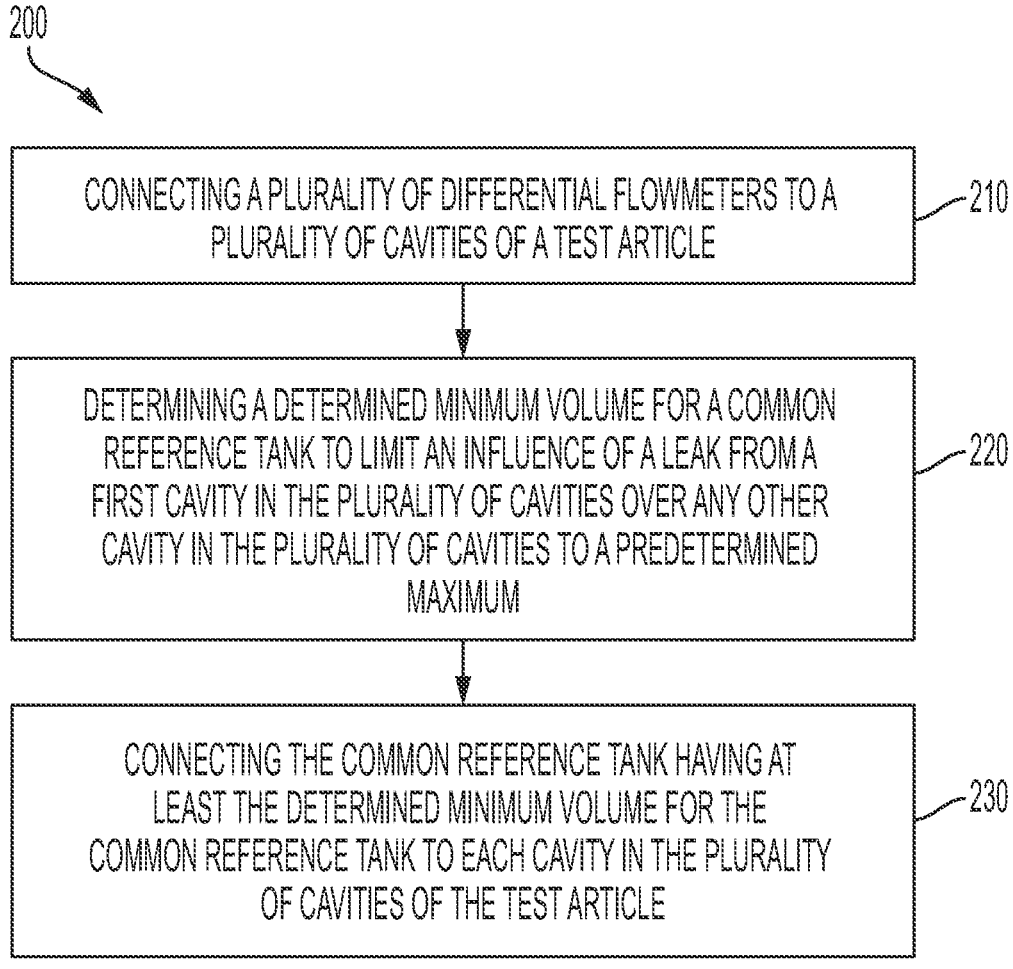

200

CONNECTING A PLURALITY OF DIFFERENTIAL FLOWMETERS TO A PLURALITY OF CAVITIES OF A TEST ARTICLE — 210

DETERMINING A DETERMINED MINIMUM VOLUME FOR A COMMON REFERENCE TANK TO LIMIT AN INFLUENCE OF A LEAK FROM A FIRST CAVITY IN THE PLURALITY OF CAVITIES OVER ANY OTHER CAVITY IN THE PLURALITY OF CAVITIES TO A PREDETERMINED MAXIMUM — 220

CONNECTING THE COMMON REFERENCE TANK HAVING AT LEAST THE DETERMINED MINIMUM VOLUME FOR THE COMMON REFERENCE TANK TO EACH CAVITY IN THE PLURALITY OF CAVITIES OF THE TEST ARTICLE — 230

FIG. 9

APPARATUS AND METHOD FOR AUTOMATIC LEAK DETECTION

CROSS-REFERENCE TO RELATED APPLICATION

This application claims the benefit of U.S. Provisional Application Ser. No. 63/087,673, filed Oct. 5, 2020, which is incorporated by reference herein.

TECHNICAL FIELD

The present disclosure relates generally to an apparatus and method for automatic leak detection.

BACKGROUND

Leak testing is used for quality control in the manufacturing of some devices. Leak testing is applied in wide range of industries, including manufacturing of: automobiles and automotive components, medical equipment, electronic devices, valves, packaging, appliances, aerospace vehicles and components, Heating Ventilation and Air Conditioning (HVAC) equipment, agricultural machines and equipment, and batteries.

For example, a manufacturing process for an internal combustion engine may include air leak testing of the internal combustion engine in a fully assembled state on an assembly line. Identifying and locating leaks at the production rate of the assembly line may be difficult.

INTRODUCTION

In a first aspect of the present disclosure, an apparatus for automatic leak detection comprises: an adiabatic tank; an electronic pressure regulator in fluid communication with the adiabatic tank; and an electronic processor in electronic communication with the electronic pressure regulator, wherein: the electronic processor is to automatically determine an optimum adiabatic pressure based on an ambient atmospheric pressure, a test pressure, and an ambient air temperature; and the apparatus is to generate the optimum adiabatic pressure automatically in the adiabatic tank via the electronic pressure regulator in communication with the electronic processor.

In examples of the first aspect, the apparatus is further to adapt the optimum adiabatic pressure based on an average of test results that are indicative of a test article having an acceptable level of leakage.

In examples of the first aspect, the apparatus is to automatically determine a determined minimum heat exchanger volume to add to the apparatus. In examples, the apparatus further comprises a heat exchanger having at least the determined minimum heat exchanger volume. In examples, the heat exchanger may be a line pressure stabilization tank and heat exchanger.

In examples of the first aspect, the apparatus is to automatically determine a determined minimum adiabatic tank volume for the adiabatic tank. In examples, the adiabatic tank has at least the determined minimum adiabatic tank volume for the adiabatic tank.

In examples of the first aspect, the apparatus further comprises: a first differential flowmeter connected to a first cavity of a test article; a second differential flowmeter connected to a second cavity of the test article; and a common reference tank connected to the first cavity of the test article and the second cavity of the test article, the common reference tank having a predetermined minimum volume to limit an influence of a first leak from the first cavity over the second cavity to a predetermined maximum. In examples, the test article is a valve body for an automatic transmission.

In examples of the first aspect, the apparatus, further comprises: a plurality of differential flowmeters connected to a plurality of cavities of a test article; and a common reference tank connected to each cavity in the plurality of cavities of the test article, the common reference tank having a predetermined minimum volume to limit an influence of a first leak from a first cavity over any other cavity in the plurality of cavities to a predetermined maximum. In examples, the test article is a valve body for an automatic transmission. In examples, the plurality of differential flowmeters is connected to the plurality of cavities of the test article with a one-to-one correspondence.

In examples of the first aspect, the electronic processor is to automatically determine an influence of an indirect error source in a test circuit on a leak measurement, wherein the apparatus is to compensate reported leak test results based on the influence of the indirect error source on the leak measurement. In examples, the indirect error source includes a cross-channel leak. In examples, the indirect error source includes a common reference tank in fluid communication with each cavity in a plurality of cavities of a test article.

It is to be understood that any features of the apparatus for automatic leak detection disclosed herein may be combined together in any desirable manner and/or configuration.

In a second aspect of the present disclosure, a method for automatic leak detection comprises: connecting a first differential flowmeter to a first cavity of a test article; connecting a second differential flowmeter to a second cavity of the test article; determining a determined minimum volume for a common reference tank to limit an influence of a first leak from the first cavity over the second cavity to a predetermined maximum; and connecting the common reference tank having at least the determined minimum volume for the common reference tank to the first cavity of the test article and the second cavity of the test article.

In examples of the second aspect, the method further comprises: determining a determined influence of an external leak from the first cavity on an uncompensated leak test result from the second cavity caused by the first cavity and the second cavity being connected to the common reference tank; and compensating a reported leak test reading for the second cavity by offsetting the determined influence.

It is to be understood that any features of this method may be combined together in any desirable manner. Moreover, it is to be understood that any combination of features of this method and/or of the apparatus for automatic leak detection may be used together, and/or combined with any of the examples disclosed herein.

In a third aspect of the present disclosure, a method for automatic leak detection comprises: connecting a plurality of differential flowmeters to a plurality of cavities of a test article; determining a determined minimum volume for a common reference tank to limit an influence of a leak from a first cavity in the plurality of cavities over any other cavity in the plurality of cavities to a predetermined maximum; and connecting the common reference tank having at least the determined minimum volume for the common reference tank to each of cavity in the plurality of cavities of the test article.

In examples of the third aspect, the method further comprises: determining a determined influence of an external leak from the first cavity on an uncompensated leak test result from the other cavity in the plurality of cavities, wherein the influence is caused by the first cavity and the other cavity in the plurality of cavities being connected to the common reference tank; and compensating a reported leak test reading for the other cavity by offsetting the determined influence. In examples, the plurality of differential flowmeters is connected to the plurality of cavities of the test article with a one-to-one correspondence.

It is to be understood that any features of this method may be combined together in any desirable manner. Moreover, it is to be understood that any combination of features of this third aspect method and/or of the second aspect method and/or of the apparatus for automatic leak detection may be used together, and/or combined with any of the examples disclosed herein.

In a fourth aspect of the present disclosure, a non-transitory machine-readable medium storing instructions executable by a processor, the non-transitory machine-readable medium comprises: instructions to: automatically determine an optimum adiabatic pressure for an adiabatic tank of an apparatus for automatic leak detection; and cause the apparatus to generate the optimum adiabatic pressure automatically in the adiabatic tank via an electronic pressure regulator, wherein the automatic determining of the optimum adiabatic pressure for the adiabatic tank is based on an ambient atmospheric pressure, a test pressure, and an ambient air temperature, and wherein the apparatus for automatic leak detection includes: the adiabatic tank; the electronic pressure regulator in fluid communication with the adiabatic tank; and an electronic processor in electronic communication with the electronic pressure regulator.

It is to be understood that any features of this non-transitory machine-readable medium storing instructions executable by a processor may be combined together in any desirable manner. Moreover, it is to be understood that any combination of features of this non-transitory machine-readable medium storing instructions executable by a processor and/or of the third aspect method and/or of the second aspect method and/or of the apparatus for automatic leak detection may be used together, and/or combined with any of the examples disclosed herein.

SUMMARY

An apparatus for automatic leak detection includes an adiabatic tank, an electronic pressure regulator in fluid communication with the adiabatic tank, and an electronic processor in electronic communication with the electronic pressure regulator. The electronic processor is to automatically determine an optimum adiabatic pressure based on an ambient atmospheric pressure, a test pressure, and an ambient air temperature. The apparatus is to generate the optimum adiabatic pressure automatically in the adiabatic tank via the electronic pressure regulator in communication with the electronic processor.

BRIEF DESCRIPTION OF THE DRAWINGS

Features of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

FIG. 8 is a flow chart depicting a method of the present disclosure; and

FIG. 9 is a flow chart depicting another method of the present disclosure.

DETAILED DESCRIPTION

In examples of the present disclosure, multiple fill points, compressed air tanks and heat exchangers may be included to improve the performance of a leak test station. In examples of the present disclosure, leak test instruments may automatically calculate and generate an ideal adiabatic pressure for the compressed air tanks, at the current altitude and weather conditions of the test stations. In some examples, the leak test system may help to identify an area that leaks in a main engine cavity.

Each component of a test article, for example, an automotive internal combustion engine, may be tested for leaks at multiple assembly levels in the manufacturing process of the test article. Some test articles, such as engines, may be designed to contain certain operating fluids (e.g., oil, engine coolant and exhaust gases). During manufacturing, the test articles may be leak tested with air, rather than the operating fluids. Leak testing with air before the introduction of other materials (e.g., the operating fluids) may reduce a risk of spills and leaks of the other materials.

Although some individual components of an assembly may be leak tested before final assembly, it may be desirable to verify that the whole assembly, such as an engine, does not leak. Such a test of the assembly may be performed on a production line at a designated rate or cycle time. In some examples, the cycle time may be less than two minutes. By way of example, a cycle time of two minutes means one assembly is air leak tested every two minutes. In examples, such air leak testing may be performed before each engine is mounted in a vehicle or to outside accessories (i.e., a radiator) and before the engine is filled with fluids (i.e., oil, coolant).

Automotive engines may be large devices with a plurality of internal cavities that may tend to fill slowly (i.e., an oil pump circuit). Some "classic" leak tests may be capable of detecting gross assembly errors like a missing or defective oil cap or drain plug. More specific and sensitive leak testing information than is possible using "classic" leak tests may be desirable in some instances.

Figure 1:
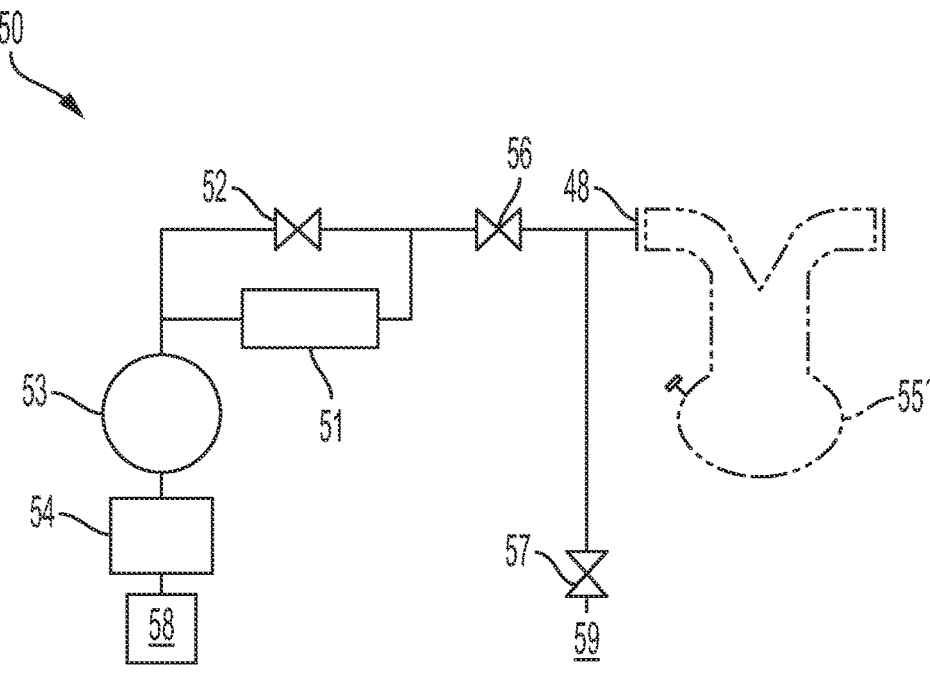
FIG. 1 is a semi-schematic diagram of a classic leak test system connected to an engine.

Referring to FIG. 1, a "classic" engine leak test system 50 uses a flowmeter 51. This flowmeter could be either a heat exchange-based mass flowmeter or a laminar flowmeter with a very large flow rating pressure regulator 53, large bypass valve 52 and large hose connection 48 to the engine 55'. In other examples of a "classic" engine leak test system, a pressure gauge (not shown) or absolute pressure decay system (not shown) may be used. FIG. 1 also depicts a pre-regulator 54, a shut-off valve 56, an exhaust valve 57, atmosphere 59, plant line pressure 58 arranged and connected as shown in semi-schematic FIG. 1.

Figure 2:
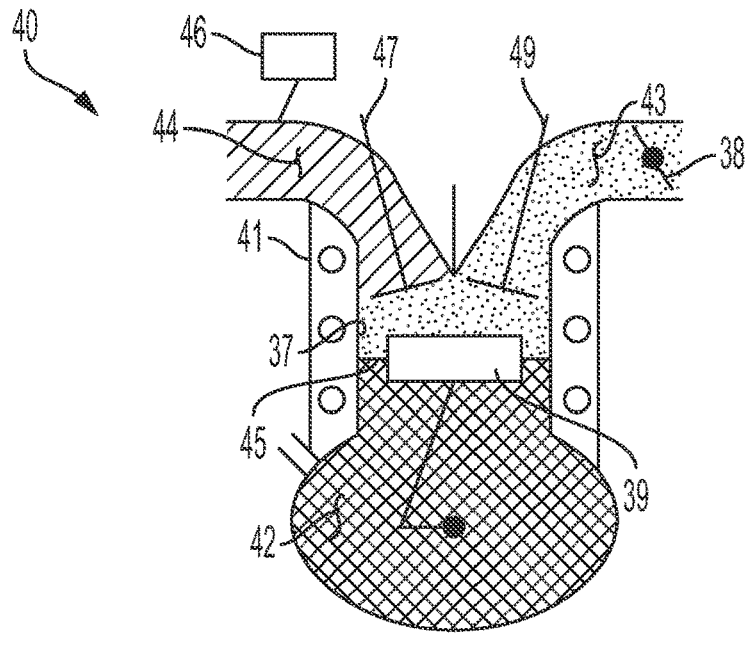
FIG. 2 is a semi-schematic diagram of an internal combustion engine.

Referring to FIG. 2, in some examples, an engine may have 4 cavities for leak testing. The 4 cavities may include a water jacket 41, oil cavity 42, intake cavity 43 and exhaust cavity 44. The "classic" engine air leak test, described above, cannot differentiate between a leak in the oil cavity 42, the intake cavity 43 or the exhaust cavity 44 since the cavities are in fluid communication because of leakage at the piston rings 45. The metal to metal contact between the piston rings 45 and the cylinder wall 37 does not establish a completely leak tight seal for air introduced as a test fluid. Also depicted in FIG. 2 are a piston 39, throttle 38, Exhaust Gas Recirculation (EGR) Valve 46, intake valve 49, and engine exhaust valve 47 arranged for a 4-stroke engine 40.

For the "classic" engine leak test system, there are two cavities to test: the water jacket and the main engine cavity. The main engine cavity includes the oil cavity 42, the intake cavity 43 and the exhaust cavity 44 depicted in FIG. 2. In the "classic" engine leak test, an engine is tested concurrently with two flowmeters, at two different pressures to be able to detect a leak between the two cavities (the water jacket 41 and the main engine cavity). A leak between the two cavities may be detected as a pressure increase in the lower pressure cavity. Typically, in "classic" engine leak testing, the water jacket is the higher pressure cavity.

At the speed of a typical engine manufacturing line, approximately 2 minutes per engine, there may be sufficient time for a "classic" leak test of the water jacket. However, it may be difficult to accomplish "classic" leak testing of the main engine cavity because of the large fill volume of the main engine cavity. The time to pressurize the main engine cavity in a "classic" leak test may be relatively long due to all of the spaces that need to be filled throughout the engine, including, for example, the oil pump and the oil filter.

A test cycle time may be at least 1 minute per engine for some "classic" engine leak tests. The time available for leak testing may not be sufficient for the air to stabilize inside the engine; which can cause the flowmeters to indicate a false leak (e.g., about 630 standard cubic centimeters per minute (sccm)) on a known good engine. In some "classic" engine leak test stations, a learning cycle may be used to teach the flowmeter that 630 sccm is the flow rate curve's response to a good, i.e. non-leaking, engine. In this example of a "classic" engine leak test station on an engine production line, the 630 sccm baseline indicated leak reading may vary with the temperature and atmospheric pressure in the production plant. For example, the flowmeter could read 590 sccm in the morning and 670 sccm in the afternoon. In order to have accurate tests that reject leaking engines and do not reject engines that do not leak, frequent learning cycles on an assumed non-leaking engine may be used.

Figures 3, 4:
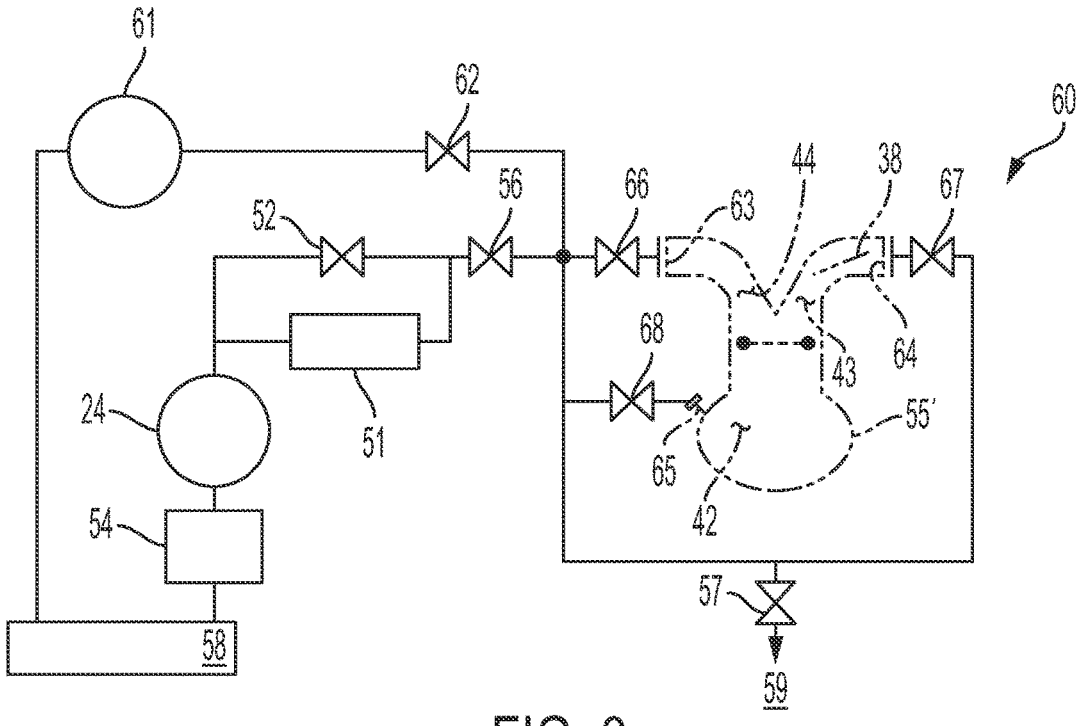
FIG. 3 is a semi-schematic diagram of an example of a leak test apparatus connected to an internal combustion engine according to the present disclosure.
FIG. 4 is a semi-schematic diagram of an example of a leak test apparatus connected to a test article that has 3 cavities according to the present disclosure.

EXAMPLE 1—FASTER FILL FIG. 3 is a semi-schematic diagram depicting an example of the present disclosure, including a fast fill apparatus 60. Example 1 reduces the fill time by filling the engine 55' with pressurized air through 3 ports simultaneously. Filling from multiple ports in the engine 55' can help fill the engine more quickly. As depicted in FIG. 3, the engine 55' may be filled through at least 3 ports: exhaust port 63, intake port 64 and oil dipstick port 65. Opening the throttle 38 in the intake cavity 43 during the leak test allows for quicker filling of the intake cavity 43. The example of the fast fill apparatus 60 depicted in FIG. 3 also includes a fast fill pressure regulator 61 and a fast fill valve 62 arranged and connected as schematically depicted in FIG. 3.

EXAMPLE 2—FASTER FILL Still referring to FIG. 3, Example 2 reduces fill time by filling at a higher pressure using a bypass valve 52 to bypass the flowmeter 51. A potential drawback to filling at higher pressure, however, is that the faster the engine is filled, the more stabilization time is needed. In addition, the higher pressure from the fast-fill gets stored in some parts of the engine and can appear as a negative leak (pressure increase in the engine main cavity during the test). Therefore, when using the high pressure bypass valve method, the fast-fill may be controlled with fill valves that are operated independently to fill the volume of each cavity. In the example depicted in FIG. 3, the exhaust fill valve 66 controls the fill of the exhaust cavity 44; the intake fill valve 67 controls the fill of the intake cavity 43, and the crankcase fill valve 68 controls the fill of the oil cavity 42.

In some examples, turning the crankshaft to a predetermined crankshaft position presents consistent cavity volumes to the leak test station which contributes to more consistent test results. Example 2 allows for faster filling without over pressurizing, however, the increase in stabilization time associated with fast filling may reduce the overall test cycle time saving, leading to relatively small net test cycle time improvements from fast filling.

Troubleshooting may, in some cases, be relatively complicated because an already-filled engine cannot be retested using the same leak tester instrument settings because of the possibility of over pressurizing the engine 55'. The leak tester according to Example 2 may have a troubleshooting mode where the leak tester pressurizes the engine 55' at the test pressure repeatedly without exhausting the air. This would provide the flowmeter 51 readings on a fully stabilized engine at the test pressure, or allow for a soapy water leak location test to be performed.

Referring to FIG. 4, in examples of the present disclosure, an apparatus 20 for automatic leak detection includes an adiabatic tank 22 and an electronic pressure regulator 21 in fluid communication with the adiabatic tank 22, and an electronic processor 33 in electronic communication with the electronic pressure regulator 21. The electronic processor 33 is to automatically determine an optimum adiabatic pressure based on an ambient atmospheric pressure, a test pressure, and an ambient air temperature. The atmospheric pressure and ambient air temperature may be measured by the apparatus 20, or communicated to the apparatus 20 from, for example, a weather station, via a network. The test pressure may be a predetermined test pressure, or may be determined by the apparatus 20. The apparatus 20 is to generate the optimum adiabatic pressure automatically in the adiabatic tank 22 via the electronic pressure regulator 21 in communication with the electronic processor 33.

In examples, the apparatus 20 is further to adapt the optimum adiabatic pressure based on an average of test results that are indicative of a test article having an acceptable level of leakage.

In examples, the apparatus 20 is to automatically determine a determined minimum heat exchanger volume to add to the apparatus 20. The apparatus 20 may include a heat exchanger 26 having at least the determined minimum heat exchanger volume. In examples, the heat exchanger 26 may be a line pressure stabilization tank and heat exchanger 26.

In examples, the apparatus 20 is to automatically determine a determined minimum adiabatic tank volume for the adiabatic tank 22. In examples, the adiabatic tank 22 has at least the determined minimum adiabatic tank volume for the adiabatic tank 22.

In examples, the apparatus 20 further includes a first differential flowmeter 30 connected to a first cavity 44 of a test article 55, a second differential flowmeter 31 connected to a second cavity 42 of the test article 55; and a common reference tank 29 connected to the first cavity 44 of the test article 55 and the second cavity 42 of the test article 55. The common reference tank 29 may have a predetermined minimum volume to limit an influence of a first leak from the first cavity 44 over the second cavity 42 to a predetermined maximum. In examples, the test article 55 may include a valve body 71 (FIG. 6) for an automatic transmission. In examples, the test article 55 may include an engine 55'. In examples, the engine 55' may be a 4-cycle internal combustion engine, or any kind of engine with pistons, and valves.

In examples, the apparatus 20 may further include a plurality of differential flowmeters 30, 31, 32 connected to a plurality of cavities 44, 42, 43 of a test article 55 and a common reference tank 29 connected to each cavity 44, 42, 43 in the plurality of cavities 44, 42, 43 of the test article 55. The common reference tank 29 may have a predetermined minimum volume to limit an influence of a first leak from a first cavity 44 over any other cavity 42, 43 in the plurality of cavities 44, 42, 43 to a predetermined maximum. In examples, the test article 55 may include a valve body 71 for an automatic transmission. In examples, the plurality of differential flowmeters 30, 31, 32 is connected to the plurality of cavities 44, 42, 43 of the test article 55 with a one-to-one correspondence.

A non-transitory machine-readable medium storing instructions executable by a processor, the non-transitory machine-readable medium including instructions to automatically determine an optimum adiabatic pressure for an adiabatic tank 22 of an apparatus 20 for automatic leak detection. The instructions may further be to cause the apparatus 20 to generate the optimum adiabatic pressure automatically in the adiabatic tank 22 via an electronic pressure regulator 21. The automatic determining of the optimum adiabatic pressure for the adiabatic tank 22 may be based on an ambient atmospheric pressure, a test pressure, and an ambient air temperature. The apparatus 20 for automatic leak detection may include the adiabatic tank 22, the electronic pressure regulator 21 in fluid communication with the adiabatic tank 22; and an electronic processor 33 in electronic communication with the electronic pressure regulator 21.

EXAMPLE 3—THERMODYNAMIC COMPENSATION The air stabilization time inside a relatively large rigid test article (e.g., an engine) depends on several factors. A leak test fixture may be configured to reduce air stabilization time by avoiding unsecured parts; for example, moving valves or expanding test hoses. Some unchangeable aspects of the test article 55 may lead to longer fill times (including stabilization time); for example, the paper material of an engine oil filter and casting porosities that do not leak to the outside. In examples, most of the engine 55' may be generally rigid cast metal (e.g., aluminum), but some hoses or valve covers may be relatively flexible. Allowing for stabilization time before taking a leak measurement may yield more repeatable and accurate results. Stabilization time may include time for the flexible parts to finish stretching before taking a leak measurement. However, since fixture hardware may be difficult to change once a test fixture is designed, approved and built, reducing the fill time (including stabilization) for flexible test article parts by changing the test fixture hardware may be relatively difficult.

Heat exchange is an aspect of leak test fixture operation. Thermodynamics explains that air cools when air is decompressed, and warms up when air is compressed. Filling a test article 55, e.g., an engine 55', with air that was recently decompressed from plant line pressure, (i.e., expanding from around 90 pounds per square inch (PSI) to 2 PSI, for example) causes significant thermodynamic effects or heat exchange.

Even though, as stated above, test fixtures cannot do much to speed up stabilization times for porous or flexible test articles, as disclosed herein, test fixtures can counter heat exchange. During a fill or fast-fill leak test cycle, the cold air freshly decompressed from around 90 PSI to 2 PSI mixes with and compresses the atmospheric air inside the test article 55, causing the air that was already inside the test article to warm up. The mixing between the air from these two sources and the contact with the test article 55 (e.g., the engine 55') at room temperature creates the air flow levels seen on flowmeters as stabilization. According to the Ideal Gas Law, when the temperature of a fixed volume of gas changes, pressure changes proportionately (PV=nRT; P=pressure, V=volume, n=amount of substance, R=ideal gas constant, T=temperature).

As disclosed herein, heat exchange can be reduced by feeding air from a lower controlled pressure that is already at room temperature, rather than air that is decompressed from 90 PSI. By knowing the quantity of air molecules that are heated up inside the test article 55 and the quantity of air molecules that are added, a tank pressure can be selected to match the pressure that will equalize the air cooling and the air heating in the test article during the fast-fill cycle. In examples of the present disclosure, the pressure in the tank, for example the adiabatic tank 22 in FIG. 4, may be regulated to the selected pressure by, for example, pressure lowering regulator 23. The fast-fill may be done with valves, for example First FF Valve 73, Second FF Valve 74, and Third FF Valve 75 that make the cavities 42, 43, 44 communicate with the adiabatic tank 22 regulated to the selected fast-fill pressure.

In the example below, the test article 55 is an engine 55', however, the apparatus and methods disclosed herein may be applied to any suitable test article 55. Examples of suitable test articles include automobile engines, transmissions, master cylinders, heat exchangers, and various components of such assemblies.

If air is not added from the electronic pressure regulator 21 during the fast-fill and only the adiabatic tank pressure is used, a form of the ideal gas law may be applied as follows:

$$Patm*Vengine+Ptank1*Vtank1=(Patm+2\ psi)* \\ (Vtank1+Vengine) \qquad \text{Equation 1}$$

Patm=atmospheric pressure; Vengine=volume of the engine; Ptank1=pressure of the tank at the start; Vtank1=volume of the tank; and 2 psi is the test pressure.

As disclosed herein, the valves in Example 3 may be non-heating, non-leaking valves with o-ring pressurization to minimize the effects of heat. In examples, the valves may be Y valves, available from ATEQ.

In examples, the tank that stores the air at the pre-fill pressure may be metal because the tank may function as a heat exchanger to bring the decompressed air to ambient temperature. In examples, flow restrictors or another pressure regulator may be used to reduce the fill flow rate to make sure that the pressure does not go above (i.e., over-shoot) a given pressure specified by the engine manufacturer.

The last step of the fill may be done through a regular pressure regulator with test pressure air at ambient temperature by using another metal tank heat exchanger with non-heating, non-leaking valves with o-ring pressurization.

When the air flows quickly from the tank to the engine, the air experiences "adiabatic" decompression. As used herein, adiabatic decompression means that there is no time for heat exchange between the gas and its environment since the gas is decompressed so quickly.

The general formula for an air temperature change during an adiabatic pressure change is:

$$T2 - T1 = T1\left[\left(\frac{P2}{P1}\right)^{\frac{\gamma-1}{1}} - 1\right]$$

Equation 2

T1=initial temperature; T2=resulting temperature; P1=initial absolute pressure; P2=final absolute pressure; and γ=adiabatic index. Since air is made primarily of diatomic molecules of Nitrogen and Oxygen, γ=7/5.

Temperature Drop from Expansion

In an example, a leak test is performed at 2 Pounds per Square Inch Gauge (PSIG) (16.5 Pounds per Square Inch Absolute (PSIA)). The line pressure at the plant is 90 PSIG (104.5 PSIA) at a plant temperature of 20 Celsius (293 Kelvin). The temperature of the air to be injected into the engine may be calculated as follows:

If ambient temperature in the plant is 20° C., T1=293.15 Kelvin

P2=16.5 PSIA; P1=104.5 PSIA $$\frac{\gamma-1}{\gamma} = \frac{\frac{7}{5} - \frac{5}{5}}{\frac{7}{5}} = \frac{2}{7} \cong 0.28$$

Equation 3

T2−T1=293.15×((16.5/104.5)^(2/7)−1)

T2−T1=−118° C. i.e., the temperature difference from ambient is −118° C.

Therefore T2=−98° C. (~−144° F.)

This helps to explain why the stabilization time is long, and why very dry air is needed in order to avoid condensation. The air is so cold that it takes a long time for the air to stabilize at the ambient temperature.

Applying Equation 2 to calculate the temperature rise of the air already inside the engine as it is compressed (T3−T1):

P1=14.5 PSIA atmospheric pressure in plant; P2=16.5 PSIA

T3−T1=293.15×((16.5/14.5)^(2/7)−1)=11.02° C.

Air Temperature

In the sample calculation above, the temperature of the atmospheric air inside the engine increases by a smaller amount than the temperature drop calculated for the air injected into the engine. There are more air molecules being compressed (and experiencing an increase of 11.02° C.) than there are air molecules being decompressed (and experiencing a decrease of about 98° C.). The goal is to get the number of molecules n2 added with their temperature decrease from ambient to equal the number of molecules n1 in the engine and their temperature increase to T3 to even out the heat inside the engine as shown in Equation 4:

−(T2−T1)n2=(T3−T1)n1    Equation 4

Ptest=test pressure (gage). The number of molecules added to the engine to reach Ptest can be calculated using Boyles Law: PV=nRT since we consider T to be constant.

Vengine=volume of the engine main cavity

Vengine=volume of (oil cavity 42+intake cavity 43+exhaust cavity 44)

Patm=absolute atmospheric pressure in the plant

Ptank=gage pressure in the "adiabatic" tank

Before the Fill:

Patm×Vengine=n1RT n1=(Patm×Vengine)/(RT)

After the Fill:

(Patm+Ptest)×Vengine=(n1+n2)RT substituting for n1:

(Patm+Ptest)×Vengine=(Patm*Vengine)+n2RT n2=Ptest×Vengine/RT

The Goal is:

substituting for n1 and n2 in Equation 4

−(T2−T1)PtestVengine/RT=(T3−T1)PatmVengine/RT

−(T2−T1)Ptest=(T3−T1)Patm    Equation 5

Evaluating Equation 2 for $T2 - T1$ yields $T1 * \left(\left(\frac{Patm + Ptest}{Ptank + Patm}\right)^{\frac{2}{7}} - 1\right)$ Evaluating Equation 2 for $T3 - T1$ yields $T1 * \left(\left(\frac{Patm + Ptest}{Patm}\right)^{\frac{2}{7}} - 1\right)$ Substituting into Equation 5

$$-T1 * \left(\left(\frac{Patm + Ptest}{Ptank + Patm}\right)^{\frac{2}{7}} - 1\right) * Ptest = T1 * \left(\left(\frac{Patm + Ptest}{Patm}\right)^{\frac{2}{7}} - 1\right) * Patm$$

Resolving algebraically for Ptank:

$$Ptank = \frac{Patm + Ptest}{\left\{\left[\frac{-Patm}{Ptest} * \left(\left(\frac{Patm + Ptest}{Patm}\right)^{\frac{2}{7}} - 1\right)\right] + 1\right\}^{\frac{7}{2}}} - Patm$$

Equation 6

Evaluating Equation 6 for Patm=14.5 PSI and Ptest=2 PSI:

$$Ptank = \frac{14.5 + 2}{\left\{\left[\frac{-14.5}{2} * \left(\left(\frac{14.5 + 2}{14.5}\right)^{\frac{2}{7}} - 1\right)\right] + 1\right\}^{\frac{7}{2}}} - 14.5$$

$$Ptank = \frac{16.5}{\{[-7.25 * (1.037607 - 1)] + 1\}^{\frac{7}{2}}} - 14.5$$

$$Ptank = 50.28 - 14.5$$

$$Ptank = 35.78 \; PSIG$$

The adiabatic optimum tank pressure is not necessarily what would have been guessed.

Atmospheric Variations

Atmospheric pressure varies with time and location, depending on such factors as weather conditions and altitude. As such, assuming that Patm=14.5 PSI may lead to errors that are significant to leak testing.

In examples of the present disclosure, an air leak test system may automatically calculate the adiabatic tank pressure (Ptank) and achieve the adiabatic tank pressure (Ptank) by using an electronic pressure regulator.

The automatic calculation of the adiabatic tank pressure (Ptank) and electronic regulation of the adiabatic tank pressure (Ptank) may be desirable for any manufacturing location, however, particular advantages may be realizable at high altitude manufacturing locations.

For example, to calculate Ptank in Toluca, Mexico, where the elevation is 2,660 m (8,730 ft), the average atmospheric pressure is approximately:

$$1013-(2660\times0.1)=747 \text{ millibars } (10.84 \text{ PSI})$$

Applying Equation 6 with test pressure of 2 PSI:

$$Ptank = \frac{10.84+2}{\left\{\left[\left[\frac{-10.84}{2}*\left(\left(\frac{10.84+2}{10.84}\right)^{\frac{2}{7}}-1\right)\right]+1\right\}^{\frac{7}{2}}} - 10.84$$

Ptank=27.54 PSIG for optimum balanced adiabatic effect in Toluca, Mexico.

To apply this information, the tank pressure can be fine tuned to pass a repeatability study where the leak test apparatus is originally built at sea level with Ptank=35.78 PSIG. When the leak test machine is installed/operated in the final location, Ptank may require adjustment because of a difference in altitude compared to the location where the leak test apparatus was originally built. As disclosed herein, Ptank may be automatically adjusted to compensate for atmospheric pressure variation.

While flowmeters were previously mentioned herein, it is to be understood that elements of the present disclosure may be applied to any air leak test, regardless of the technology used to sense the leak. Some non-limiting examples of leak detection technology that may be implemented in the present disclosure include: heat exchange mass flow, gauge or absolute pressure decay, differential pressure decay, laminar flow, differential mass flow, and differential laminar flow.

TANK SIZE In examples, it may be desirable to have a tank that is large enough so the tank pressure regulator does not add pressure during the fast-fill time.

Boyle's law can be used again to determine the minimum size of such a tank.

Vtank=volume of the "adiabatic" tank $$(Ptank+Patm)Vtank+PatmVengine=$$

$$(Ptest+Patm)Vtank+(Ptest+Patm)Vengine$$

$$(Ptank+Patm-Ptest-Patm)Vtank=(Ptest+Patm-Patm)Vengine$$

$$Vtank=Ptest*Vengine/(Ptank-Ptest) \qquad \text{Equation 7}$$

Recalling from the sea-level example: Ptank=35.78 PSI, Ptest=2 PSI and applying Equation 7:

$$Vtank=(2/(35.78-2))Vengine$$

Therefore, in the example, the minimum adiabatic tank volume is Vtank=0.030*Vengine MEASUREMENT DRIFT If the air getting into the test machine is not at a repeatable pressure or temperature, measurement drift can occur despite the adiabatic tank. To compensate for this drift, a line pressure stabilization tank and heat exchanger 26 (See FIG. 4) may be included to store the dry filtered air at, e.g., 60 PSI to feed the electronic pressure regulator 21 (See FIG. 4) with air at a constant pressure at ambient temperature.

Vlinep=the minimum volume of the line pressure stabilization tank and heat exchanger 26

PV=constant, Boyle's law $$Vlinep=Vtank*Ptank/60 \text{ PSI}$$

Applying the minimum adiabatic tank volume from the sea-level example above, the minimum volume for the line pressure stabilization tank and heat exchanger 26 for the sea-level example is:

$$Vlinep=Vtank*(35.78 \text{ PSI})/(60 \text{ PSI})=0.596*Vengine$$

Figure 7:
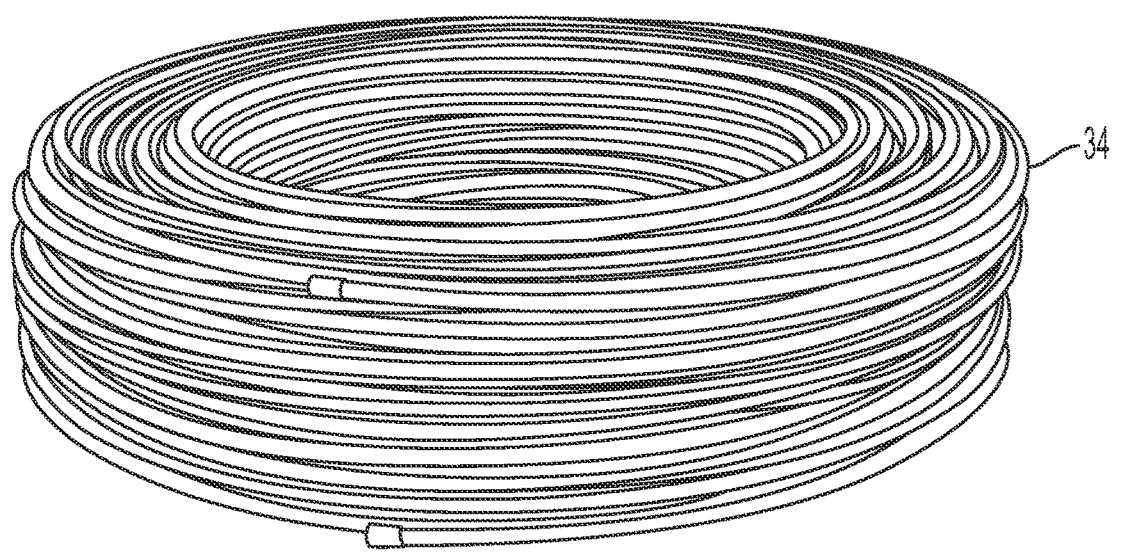
FIG. 7 is a perspective view of a coil of copper tubing.

The flowmeters 30, 31, 32 may see the fluctuations of the pressure regulator oscillating with the engine volume. In order to reduce the pressure fluctuations, an instrument (like a copper tube coil wrapped in insulation and put in a cabinet) that uses a pressurized volume to feed the flowmeters 30, 31, 32 during the test time can be added. An example of such an instrument is the common insulated reference tank 29 in FIG. 4. FIG. 7 depicts an example of a coil of copper tubing 34.

The line pressure stabilization tank and heat exchanger 26 does not exchange heat with the environment during a test so it does not affect the measurement, but the line pressure stabilization tank and heat exchanger 26 can quickly exchange heat internally when re-pressurized after a test.

When using a tank to feed the flowmeter, the readings of the flowmeter are affected by the ratios of tank volume and engine volume, as shown by Equation 8 below:

$$\text{Flow displayed}=\text{Flow read}\times(Vengine+Vtank)/Vtank \qquad \text{Equation 8}$$

As disclosed herein, the leak test instrument may compensate for the volume ratios by having Equation 8 built-in to the tester.

TANK TOTAL As depicted in FIG. 4, examples of the present disclosure may include at least 4 tanks: 1. line pressure stabilization tank and heat exchanger 26; 2. Adiabatic tank 22; 3. common reference tank 29; and 4. Test Pressure regulator heat exchanger 25.

Some examples of the present disclosure may include provisions to detect leaks associated with an Exhaust Gas Recirculation (EGR) valve clamp (not shown). In some instances, if the EGR valve clamp is not installed before a leak test, the flowmeter may not be able to read zero leak on the master engine, no matter the time adjustment.

Examples of the present disclosure, implemented to test engines and transmissions, may measure air flow with very low differential pressure (e.g., 7 Pa (0.001 PSI)). Such a low pressure sensitivity of the test apparatus 20 may give a faster response time to the flowmeters 30, 31, 32. It takes less time to establish 7 Pa of pressure drop in an engine through a leak than it takes to establish 7000 Pa through the same leak. Therefore, the 7 Pa apparatus disclosed herein may respond about 1000 times faster than a 7000 Pa device detecting the same leak.

Test Results

Figure 5:
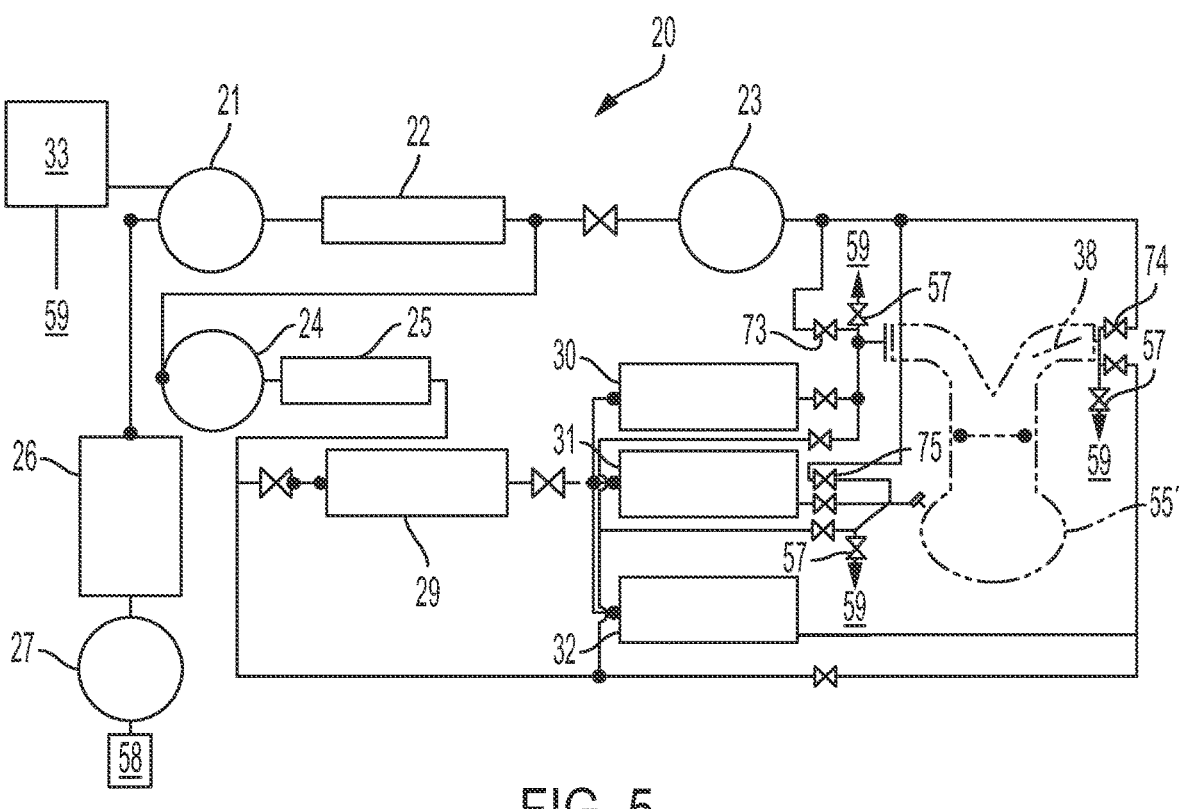
FIG. 5 is a semi-schematic diagram of an example of a leak test apparatus connected to a test article that is an engine according to the present disclosure.

A "classic" engine leak test system 50 as depicted in FIG. 1 was used to test a master engine. The flowmeter 51 indicated an average of 630 sccm, (590 sccm to 670 sccm). A 3-cavity differentiating leak test apparatus 20 as depicted in FIG. 5 was used to test the same master engine. The flowmeters 30, 31, and 32 together indicated about 90 sccm on the master engine. The overall cycle time requirement was too short for a perfect zero reading for the zero-leak master engine.

By lowering the offset, the offset also became very repeatable and reproducible from morning to evening and from one day to the next. Resolution was improved: a dependable flowmeter reading that is reproducible at 90 sccm, +/−5 sccm allows an engine that gives a reading of 100 sccm to be rejected with relatively high certainty that there is a leak.

With the leak test apparatus of the present disclosure, a learning cycle is no longer required for the leak test apparatus to learn that 90 sccm or 95 sccm is to be considered zero. The leak test apparatus of the present disclosure may display the true measurement. In an example, an EGR leak is not zeroed. For example, if an EGR clamp is not present during leak testing, the leak test apparatus of the present disclosure could indicate a leak flowrate of about 150 sccm.
Finding Leaks Finding small leak locations on a big engine with soapy water or tracer gas sniffing to see if the leak was in a critical area can be a time consuming task. Locating the leak may require additional cycle time for air stabilization in the engine, but examples of the present disclosure may be capable of such leak location.

As shown in FIG. 2, an engine main cavity may be divided into three chambers by the pistons 39 and engine valves (e.g., intake valves 49 and engine exhaust valves 47). Leaks originating at the piston rings 45, engine exhaust valves 47, and intake valves 49 may be much larger than the leak that is to be detected without preventing detection of the small leak. For example, the leak to be detected may be a small leak in a casting wall between two chambers, such as a cylinder block leak between the oil cavity 42 (crankcase) and the intake cavity 43 (combustion chamber). Examples of the present disclosure that can detect leak locations may include 3 flowmeters 30, 31, 32 with each flowmeter 30, 31, 32 having a very low pressure drop as depicted in FIG. 5.

For example, if intake valves 49 and engine exhaust valves 47 were tested for leaks of a maximum of 100 sccm at 14.5 PSI (100,000 Pa), and the piston rings were tested for leaks at a maximum of 10,000 sccm also at 14.5 PSI, then the maximum leak between two cavities would be the piston ring leak. If the piston ring leak were at the maximum (10,000 sccm at 14.5 PSI) between the two cavities separated by the piston/piston ring, the piston ring leak does not prevent detection of leaks to the outside when both cavities are fed by the same tank during a leak test. For example, assume the maximum difference of pressure between two chambers fed by the same tank is 7 Pa. The flow rate through the piston ring leak driven by 7 Pa pressure difference would be, by linear approximation: 10,000 sccm×7 Pa/100,000 Pa=0.7 sccm. Compared to the leaks that are to be detected (e.g., a 20 sccm at 2 PSI leak in the oil cavity located where engine oil could leak out of the engine) the 0.7 sccm maximum cross chamber (piston ring) leak would be negligible.
Easier Leak Location The 3 flowmeters 30, 31, 32 depicted in FIG. 5 allow for an easier location of the leaks. Further, the example depicted in FIG. 5 allows for different reject levels depending on the cavity. For example, a porosity of 20 sccm at 2 PSIG may be acceptable on the intake or exhaust circuit, but the same size leak may not be acceptable from the oil cavity where it could result in an oil leak if undetected.

Example—Automatic Transmission Leak Test

Figure 6:
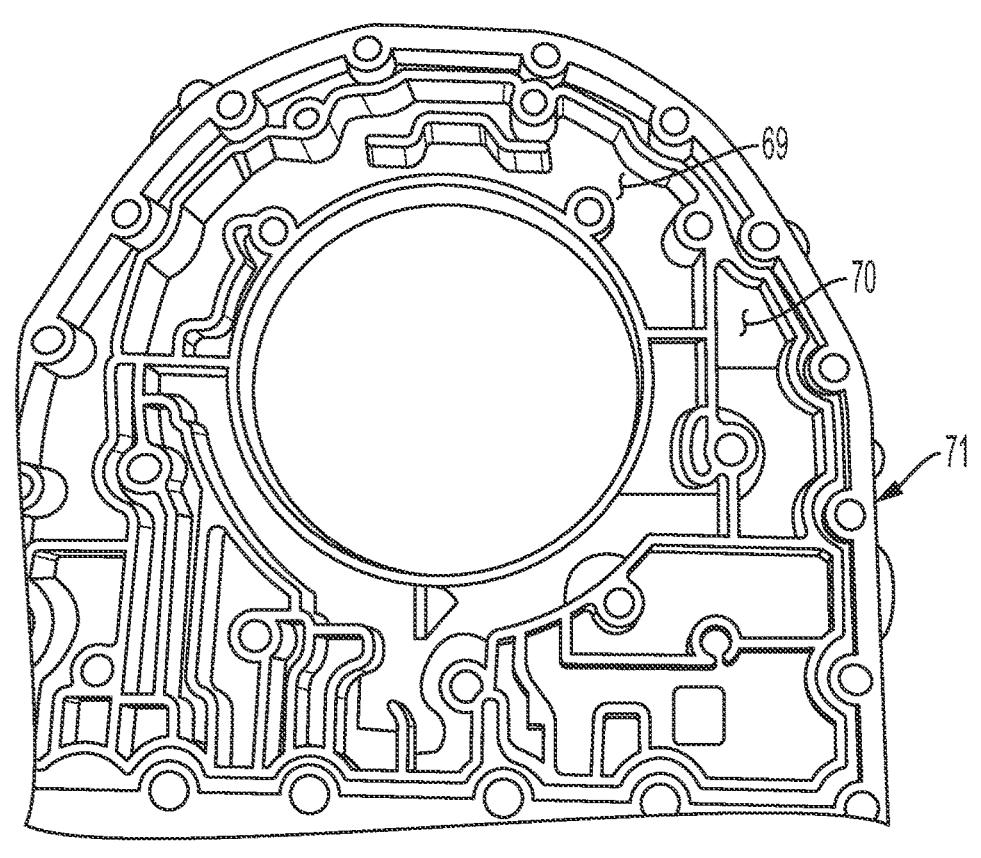
FIG. 6 is a partial perspective view of an automatic transmission casting.

Air leak testing an automobile transmission may start at the component level, and extend to the fully assembled transmission. Depending on how many speeds the transmission has, the component under test can have 10 or more cavities to test. FIG. 6 depicts an automatic transmission casting with a plurality of channels for containing pressurized fluid. In FIG. 6, a first channel is depicted at reference numeral 69 and a second channel is depicted at reference numeral 70.

A large internal leak can sometimes lead to reduced efficiency and unwanted gear shifting. A small internal leak, however, may not have a significant effect on the operation or durability of the transmission. The specifications for some transmissions may allow different air leakage for leaks to the outside (i.e., 0.9 sccm at 1 bar) compared to the inside or cross-channel leakage specification (i.e., 500 sccm at 1 bar). It is to be understood that since transmission fluid has surface tension and a higher viscosity than air, a small air leak may not necessarily result in a transmission fluid leak. As such, some small air leaks may be acceptable.

In an example, leak test flowmeters used in order to keep up with the production rate may be plumbed specifically to achieve the goal of rejecting parts with more than a small external leak, while allowing much larger leaks between cavities. In examples of the present disclosure, each cavity's leak may be measured individually. A s disclosed herein, after the leak test, the system and method may include a test to verify that the right level of fluid has been charged inside the transmission.

In examples of the present disclosure, the apparatus may include an electronic processor to determine the size of the tanks to minimize the influence of a leak in one chamber on the leak test readings in another chamber. This method also automatically determines, as a function of the measured leak readings, corrected leak readings on systems using a common reference tank 29 (See FIG. 4). The common reference tank 29 may be insulated.

Each component in an automobile transmission may tested for leaks at multiple levels in the manufacturing process. Finding leaks early may be desirable. As disclosed herein, in some transmission manufacturing processes, the components of a transmission may be tested with air or helium. Gas leak testing is sometimes desirable because gas leak testing is dry and clean.

Differential pressure decay leak testing may be acceptable for some automotive air leak test applications. In examples of the present disclosure, a combination of differential airflow meters and non-differential air flow meters may be included in the leak test apparatus.

If the exact same pressure and fluid are on both sides of a hole, there will be no flow of the fluid through the hole. Thus, if all the chambers in the transmission are pressurized at the exact same pressure, (i.e., 14.5 PSI (1 bar)), at the same time, only the leaks to the outside of the transmission will be visible. A pressure decay test may be inferior to differential airflow leak testing in such a situation because pressure decay tests inherently create a difference of pressure between cavities.

Each pressure regulator in a plurality of pressure regulators may regulate a slightly different pressure—even if the regulators have the same specifications. Thus, differences in cavity pressures may cause the flowmeters to have a pressure drop across them. However, as disclosed herein, equalized pressure can nearly be achieved if the flowmeters are all fed from the same tank pressure instead of having each chamber with its own pressure regulator.

In examples of the present disclosure, differential laminar flowmeters may be included with a 7 Pa pressure drop for the full scale, (for example, ATEQ MF differential laminar flowmeters). Thus, although there may be a 7 Pa pressure drop across the flowmeter, such a pressure drop is very small compared to the test pressure of 100,000 Pa.

For example, if a leak between two cavities is 200 sccm at 1 bar (100,000 Pa), assuming a linear approximation, the same leak under 7 Pa (worst scenario) will flow 200*7/100000=0.014 sccm. As such, the influence of the 7 Pa pressure drop on the apparent leak (0.014 sccm) is insignificant (1.55%) compared to the maximum allowable air leak to the outside (e.g., 0.9 sccm at 1 bar), Field Calibration is not Necessary In examples of the present disclosure, it may be desirable for the pressure to be the same in each chamber to prevent attempts to "Calibrate" too quickly before the pressure/flow has stabilized. The flowmeters of the present disclosure may be calibrated at the factory and certified ISO17025. The flowmeters may be fast and can give the true leak readings in a reasonable test time. The flowmeters described herein are faster because the flowmeters described herein can detect a 7 Pa pressure difference caused by the leak in the chamber under test, compared to a 1 PSI pressure drop (6890 Pa) in some other flowmeters. Thus, the 7 Pa pressure drop flowmeters may be a thousand times faster (6890 Pa/7 Pa is approximately 1000). A reading of zero pressure drop across the flowmeter described herein means zero leak, no "calibration" is necessary.

If there is a leak in one of the chambers that is large enough to cause a pressure drop in the tank, the readings on the other channels may be affected. In examples of the present disclosure, the size of a tank that is large enough to minimize an influence of a leak from one channel over another is determined.

FIG. 8 is a flow chart depicting a method 100 of the present disclosure. At box 110 the method 100 includes connecting a first differential flowmeter 30 to a first cavity 44 of a test article 55. At box 120, the method 100 includes connecting a second differential flowmeter 31 to a second cavity 42 of the test article 55. At box 130, the method 100 includes determining a determined minimum volume for a common reference tank 29 to limit an influence of a first leak from the first cavity 44 over the second cavity 42 to a predetermined maximum. At box 140, the method 100 includes connecting the common reference tank 29 having at least the determined minimum volume for the common reference tank 29 to the first cavity 44 of the test article 55 and the second cavity 42 of the test article 55.

The method 100 may further include determining a determined influence of an external leak from the first cavity 44 on an uncompensated leak test result from the second cavity 42 caused by the first cavity 44 and the second cavity 42 being connected to the common reference tank 29. The method 100 may further include compensating a reported leak test reading for the second cavity 42 by offsetting the determined influence.

FIG. 9 is a flow chart depicting a method 200 of the present disclosure. At box 210 the method 200 includes connecting a plurality of differential flowmeters 30, 31, 32 to a plurality of cavities 44, 42, 43 of a test article 55. At box 220, the method 200 includes determining a determined minimum volume for a common reference tank 29 to limit an influence of a leak from a first cavity 44 in the plurality of cavities 44, 42, 43 over any other cavity 42, 43 in the plurality of cavities 44, 42, 43 to a predetermined maximum. At box 230, the method 200 includes connecting the common reference tank 29 having at least the determined minimum volume for the common reference tank 29 to each cavity 44, 42, 43 in the plurality of cavities 44, 42, 43 of the test article 55. The plurality of differential flowmeters 30, 31, 32 may be connected to the plurality of cavities 44, 42, 43 of the test article 55 with a one-to-one correspondence.

The method 200 may further include determining a determined influence of an external leak from the first cavity 44 on an uncompensated leak test result from the other cavity 42, 43 in the plurality of cavities 44, 42, 43. The influence may be caused by the first cavity 44 and the other cavity 42, 43 in the plurality of cavities 44, 42, 43 being connected to the common reference tank 29. The method 200 may further include compensating a reported leak test reading for the other cavity 42, 43 by offsetting the determined influence.

Examples

How large of a tank would limit the influence of one channel over another to 2%?

DeltaPgen=pressure drops of in the whole system as a result from the sum of all leaks to the outside Genleak To simplify assume a 4 cavity transmission, Low pressure cavity and 3 high pressure cavities.

Let Vref=the volume of the reference tank; VLPcav=the volume of the low pressure cavity; and respectively VHPcav1 to VHPcav3 the volumes of the high pressure cavities expressed in cubic centimeters.

The external leaks are respectively LeakLPcav, LeakHP1, . . . , LeakHP3 expressed in sccm.

The relation between pressure drop, time and leak is as follows.

$$\text{DeltaPgen in Pa/Time=Genleak in sccm/}(0.0006* \\ (Vref+VLPcav+VHPcav1+VHPcav2+VHPcav3))$$

When the pressure drops in the system, each flowmeter sees a negative flow as a consequence.

$$\text{Negative flow read HP1}=0.0006*VHP1*DeltaPgen/ \\ time=0.0006*VHP1*GenLeak/0.0006*(Vref+ \\ VLPcav+VHPcav1+VHPcav2+VHPcav3)$$

$$\text{NegFlowHP1}=VHP1*GenLeak/(Vref+VLPcav+VHP- \\ cav1+VHPcav2+VHPcav3)$$

The same, respectively, for every cavity.

So, if we want NegFlowHP1 to be less than 2% of the reject level, calculate as follows:

Assume the reject level for external leaks on each HP cavity is 1 sccm.

Assume the maximum acceptable leak on every other channel: is 1 sccm

Therefore, Genleak=30 sccm

If, for example, VLPcav=2000 cc, VHpcav1=50 cc and all others the same to simplify:

We are looking for Vref when Neg Flow HP1=0.02*1=0.02

So 0.02=50*3/(Vref+2150)

So Vref=(150/0.02)-2150=5 350 cc

But, in fact, it is the leak reading on the largest cavity that is the most affected VLPcav.

So, using VPLcav, Vref=((2000*3)/0.02)-2150=(6000/0.02)-2150=297,850 cc

Since 297,850 cc is a large volume assume a 10% influence would be acceptable.

Vref=((2000*3/0.1)−2150=57,850 cc, may, in some situations, be considered more reasonable.

In examples, the electronic processor 33 is to automatically determine an influence of an indirect error source in a test circuit on a leak measurement. The apparatus 20 may be to compensate reported leak test results based on the influence of the indirect error source on the leak measurement. In examples, the indirect error source may include a cross-channel leak. In examples, the indirect error source may include a common reference tank in fluid communication with each cavity 44, 42, 43 in a plurality of cavities 44, 42, 43 of a test article 55.

How to Compensate for all Influences of One Channel on Another

By combining all the test results, all influences of one channel on another can be compensated. All the formulas are disclosed herein above.

Cross-Channel Leak Influence:

Application Parameters:

Range of all external leak flow meters in Sccm: Range A=Range B=10 sccm

Range of external leak flow meters in Pa: RAPaA=RAPaB=7 Pa Full scale

Test pressure for cross-channel leak: TP=100,000 Pa

Variables:

Measured value in sccm of cross-channel leak A-B: LeakAB

Measured value in sccm of external leak channel A: extleakA

Measured value in sccm of external leak channel B: extleakB $$\text{Corrected value external leak channel } A = \text{extleak}A + ((\text{Leak}AB^*((\text{extleak}B^*RAPaB/\text{Range}B) - (\text{extleak}A^*RAPaA/\text{Range}A))/\text{TP})$$

$$= \text{extleak}A + ((\text{extleak}B - \text{extleak}A)^*7/10)^*\text{leak}AB/100,000)$$

$$\text{Corrected value external leak Channel } B = \text{extleak}B + ((\text{extleak}A - \text{extleak}B)^*7/10)^*\text{leak}AB/100,000)$$

Certain flowmeters are inherently linear, for example, certain ATEQ flowmeters. The mathematical solution demonstrated above depends on linear flowmeters. The mathematical solution demonstrated above should not be used for a nonlinear response pressure drop to flow instrument (like a heat exchange mass flow).

For example if cross-channel leak LeakAB=50 sccm ExtLeakA=0.7 sccm et ExtleakB=0.3 sccm $$\text{Corrected Extleak}A = 0.7 + ((-0.4^*7/10)^*50/100000) = 0.7 - 0.00014 = 0.69986 \text{ sccm}$$

$$\text{Corrected Extleak}B = 0.3 + ((0.4^*7/10)^*50/100000) = 0.3 + 0.00014 = 0.30014 \text{ sccm}$$

External Leaks in Other Channels Influence Through Common Tank:

We saw previously the influence on one channel.

$$\text{NegFlowHP1} = \text{VHP1}^*\text{GenLeak}/(Vref + \text{VLPcav} + \text{VHPcav1} + \text{VHPcav2} + \text{VHPcav3})$$

So the general formula would be with Vtrans=VLPcav+VHP1+ . . . +VHP3)

$$\text{Corrected ExtLeakHP1} = \text{ExtleakHP1} - \text{VHP1}^*\text{Genleak}/(Vref + V\text{trans})$$

And the same respectively for every channel.

In examples of the present disclosure, the electronic processor can process the test results and generate a corrected test result with these two compensations in order to get the right readings, and further, no negative leak readings.

It may be desirable to design a pneumatic measurement system to minimize the need for compensations of all kinds. Therefore, a large reference tank may be desirable, because a large reference tank may reduce the complexity of system that determines compensation by the method disclosed above.

The common reference tank 29 and the pressure regulator 24 are to compensate for adiabatic decompression. In other words, the air cools down when it is decompressed. As shown in the "Engine" example above, this tank stores the optimum pressure and exchanges heat to minimize adiabatic effects when the largest cavity in a transmission is filled with air from the line pressure.

Since a function of the tank is to stabilize quickly when re pressurized after a large leak, the best materials exchange for heat exchange may include copper, aluminum, or gold. Gold does not corrode, but it is likely to be considered too expensive. Since the copper is exposed to clean filtered and dried air, there is little chance of condensation and corrosion on the inside. In examples of the present disclosure, the whole test circuit may be insulated on the outside to prevent heat exchange with the environment during the test. Inside the test apparatus, rapid heat exchange with the air is desirable.

The quantity of valves does not affect the test results if the valves are pneumatically operated and pressurized (for example ATEQ Y valves). The valves may be designed specifically for air leak testing and the valves do not heat up. Preferred valves have seals (O-rings) that do not move during the test, due to the valve pressurization that maintains the test pressure on both sides of the seal. Such valves may last millions of cycles without leak in a clean environment.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise. No language in the specification should be construed as indicating any unclaimed element as essential to the practice of the examples.

It is to be understood that the ranges provided herein include the stated range and any value or sub-range within the stated range, as if the value(s) or sub-range(s) within the stated range were explicitly recited. For example, a range from 590 sccm to 670 sccm, should be interpreted to include not only the explicitly recited limits of from 590 sccm to 670 sccm, but also to include individual values, such as about 600 sccm, 612.5 sccm, 655 sccm, etc., and sub-ranges, such as from 599 sccm to 660 sccm, etc. Furthermore, when "about" is utilized to describe a value, this is meant to encompass minor variations (up to +/−10%) from the stated value.

As used herein, the term "fluid" means a gas, liquid, or combinations thereof.

In describing and claiming the examples disclosed herein, the singular forms "a", "an", and "the" include plural referents unless the context clearly dictates otherwise.

The terms "connect/connected/connection", "attach/attached/attachment" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" or "attached to" the other component is somehow in communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. Indirect communication may include communication between two components with additional component(s) located therebetween.

While several examples have been described in detail, it is to be understood that the disclosed examples may be modified. Therefore, the foregoing description is to be considered non-limiting.

What is claimed is:

1. An apparatus for automatic leak detection in a test article, comprising:
  a first tank;
  an electronic pressure regulator in fluid communication with the first tank; and
  an electronic processor in electronic communication with the electronic pressure regulator, wherein:
  the electronic processor is to automatically determine an optimum adiabatic pressure based on an ambient atmospheric pressure, a test pressure, and an ambient air temperature, wherein the optimum adiabatic pressure is a pressure of air in the first tank that, when the air is allowed to flow from the first tank into the test article, equalizes a cooling of decompression of a first amount of air from the first tank flowing into the test article with a heating of compression of an existing amount of air in the test article at ambient temperature and pressure at a start of the flow of air from the first tank into the test article thereby causing the test article to be pressurized at the test pressure at the ambient air temperature; and
  the apparatus is to generate the optimum adiabatic pressure automatically in the first tank via the electronic pressure regulator in communication with the electronic processor.

2. The apparatus of claim 1 wherein the apparatus is further to adapt the optimum adiabatic pressure based on an average of test results that are indicative of a test article having a level of leakage that is less than or equal to a predetermined leakage level.

3. The apparatus of claim 1 wherein the apparatus is configured to automatically determine whether pressurized air input to the apparatus has variation in pressure or temperature and wherein the apparatus is configured to automatically determine, based on a volume of the first tank and a nominal pressure of the pressurized air input to the apparatus, a determined minimum heat exchanger volume for a heat exchanger to be configured to receive the pressurized air input, wherein the heat exchanger is to be configured to have an output to connect to an input side of the electronic pressure regulator to stabilize the variation in pressure or temperature of stabilized air input to the electronic pressure regulator.

4. The apparatus of claim 3, further comprising the heat exchanger having at least the determined minimum heat exchanger volume.

5. The apparatus of claim 1, wherein the apparatus is configured to automatically determine a determined minimum first tank volume for the first tank based on the test pressure, the optimum adiabatic pressure, and a volume of the test article, wherein the determined minimum first tank volume is the minimum first tank volume, when the first tank is pressurized with air at the optimum adiabatic pressure, the first tank has an amount of air sufficient to fill the test article to the test pressure at the ambient temperature during a fill portion of a single test cycle with the electronic pressure regulator remaining closed during the fill portion of the single test cycle.

6. The apparatus of claim 5, wherein the first tank has at least the determined minimum first tank volume for the first tank.

7. The apparatus of claim 1, further comprising:
  a first differential flowmeter connected to a first cavity of the test article;
  a second differential flowmeter connected to a second cavity of the test article; and
  a common reference tank connected to the first cavity of the test article and the second cavity of the test article, the common reference tank having a predetermined minimum volume to limit an influence of a first leak from the first cavity on an error in a leak test result from the second cavity to a predetermined maximum, wherein the first leak influences the error in the leak test result from the second cavity by causing a pressure drop in the common reference tank, wherein the pressure drop in the common reference tank causes the second differential flowmeter to report the error in the leak test result from the second cavity.

8. The apparatus of claim 7 wherein the test article is a valve body for an automatic transmission.

9. The apparatus of claim 1, further comprising:
  a plurality of differential flowmeters connected to a plurality of cavities of the test article; and
  a common reference tank connected to each cavity in the plurality of cavities of the test article, the common reference tank having a predetermined minimum volume to limit an influence of a first leak from a first cavity on an error included in a leak test result from an other cavity in the plurality of cavities to a predetermined maximum, wherein the first leak influences the error included in the leak test result from the other cavity in the plurality of cavities by causing a pressure drop in the common reference tank, wherein the pressure drop in the common reference tank causes a differential flowmeter selected from the plurality of differential flowmeters to report the leak test result from the other cavity wherein the leak test result from the other cavity includes the error.

10. The apparatus of claim 9 wherein the test article is a valve body for an automatic transmission.

11. The apparatus of claim 9 wherein the plurality of differential flowmeters is connected to the plurality of cavities of the test article with a one-to-one correspondence.

12. The apparatus of claim 1 wherein the electronic processor is configured to automatically determine an influence of amount of an error induced by an indirect error source in a pneumatic test circuit on a leak measurement, wherein an indirect error source is an error source other than an actual leak from a leaking cavity of the test article, wherein the leaking cavity is reported as having a leak, wherein the apparatus is to compensate reported leak test results based on the influence of amount of the error induced by the indirect error source on the leak measurement.

13. The apparatus of claim 12 wherein the indirect error source includes a cross-channel leak, wherein the cross-channel leak is a leak from a first cavity of the test article into a second cavity of the test article.

14. The apparatus of claim 12 wherein the indirect error source includes a common reference tank having a variation in pressure, wherein the common reference tank is in fluid communication with each cavity in a plurality of cavities of the test article.

15. A non-transitory machine-readable medium storing instructions executable by a processor, the non-transitory machine-readable medium comprising:

instructions to:

automatically determine an optimum adiabatic pressure for an adiabatic a first tank of an apparatus for automatic leak detection in a test article, wherein the optimum adiabatic pressure is a pressure of air in the first tank that, when the air is allowed to flow from the first tank into the test article, equalizes a cooling of decompression of a first amount of air from the first tank flowing into the test article with a heating of compression of an existing amount of air in the test article at ambient temperature and pressure at a start of the flow of air from the first tank into the test article thereby causing the test article to be pressurized at the test pressure at the ambient air temperature; and cause the apparatus to generate the optimum adiabatic pressure automatically in the first tank via an electronic pressure regulator, wherein the automatic determining of the optimum adiabatic pressure for the first tank is based on an ambient atmospheric pressure, a test pressure, and an ambient air temperature, and wherein the apparatus for automatic leak detection includes:

the first tank;

the electronic pressure regulator in fluid communication with the first tank; and an electronic processor in electronic communication with the electronic pressure regulator.

\* \* \* \* \*